(12) United States Patent
Kang et al.

(10) Patent No.: US 7,649,440 B2
(45) Date of Patent: Jan. 19, 2010

(54) APPARATUS AND METHOD FOR UNIFYING MULTIPLE RADIO FREQUENCY IDENTIFICATIONS

(75) Inventors: You Sung Kang, Daejeon (KR); Ho Won Kim, Daejeon (KR); Kyo Il Chung, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 679 days.

(21) Appl. No.: 11/584,155

(22) Filed: Oct. 20, 2006

(65) Prior Publication Data

US 2008/0068137 A1 Mar. 20, 2008

(30) Foreign Application Priority Data

Nov. 10, 2005 (KR) ...................... 10-2005-0107615

(51) Int. Cl.
*H04Q 5/22* (2006.01)

(52) U.S. Cl. ...................... 340/10.1; 380/270; 380/260; 380/273; 340/10.3

(58) Field of Classification Search ................ 340/10.1, 340/10.2, 10.3, 10.4, 10.31, 10.32, 505, 539.1, 340/539.11; 380/232, 255, 260, 261, 262, 380/259, 270, 37, 43, 284, 281, 282, 44, 380/29, 30

See application file for complete search history.

(56) References Cited

U.S. PATENT DOCUMENTS

| 5,530,702 | A | * | 6/1996 | Palmer et al. | 370/445 |
| 5,886,634 | A | * | 3/1999 | Muhme | 340/572.1 |
| 7,323,992 | B2 | * | 1/2008 | Doan et al. | 340/572.4 |
| 7,380,138 | B2 | * | 5/2008 | Chen et al. | 713/193 |
| 7,564,345 | B2 | * | 7/2009 | Devadas et al. | 340/539.1 |
| 2004/0223481 | A1 | | 11/2004 | Juels et al. | |
| 2005/0134436 | A1 | * | 6/2005 | Brookner | 340/14.69 |
| 2006/0190724 | A1 | * | 8/2006 | Adams et al. | 713/166 |

* cited by examiner

*Primary Examiner*—Daniel Wu
*Assistant Examiner*—Rufus Point
(74) *Attorney, Agent, or Firm*—Blakeley, Sokoloff, Taylor & Zafman LLP

(57) ABSTRACT

An apparatus and method for unifying multiple radio frequency identifications (RFIDs) are provided. The apparatus includes: a data arithmetic operator collecting RFIDs, storing the collected RFIDs, and repeatedly performing the collection and storage when a time out event occurs; a hash arithmetic operator concatenating the RFIDs, hashing the concatenated RFIDs, and outputting a hashed single value; a random number generator generating a random number used as an encryption factor to public-key-encrypt the single value; an RFID tag processor controlling locking/unlocking of the RFID tags; a public key arithmetic operator public-key-encrypting the single value using a predetermined public key and the random number as encryption factors and outputting a cipher text; and a radio frequency communicator converting the cipher text into a radio signal and sending the radio signal to a radio section. Information transmitted to a radio section is a cipher text obtained by public-key-encrypting the single value. Therefore, the number of the RFID tags belonging to a user is not exposed to an eavesdropper, thereby protecting user's privacy.

16 Claims, 5 Drawing Sheets

APPARATUS AND METHOD FOR UNIFYING MULTIPLE RADIO FREQUENCY IDENTIFICATIONS

This application claims the benefit of Korean Patent Application No. 10-2005-0107615, filed on Nov. 10, 2005, and in the Korean Intellectual Property Office, the disclosure of which is incorporated herein in its entirety by reference.

BACKGROUND OF THE INVENTION

1. Field of the Invention

The present invention relates to an apparatus and method for unifying multiple radio frequency identification (RFID) tags as a single encrypted value and a user privacy protection method using the single value, more particularly, to an apparatus and method for unifying identifiers of multiple RFID tags that belong to a user and encrypting the unified identifiers using a public key by which the user is recognized to have a single encrypted radio frequency identifier, and for protecting privacy of the user that owns the multiple RFID tags.

2. Description of the Related Art

Conventional user privacy protection methods are classified into kill tag methods and blocker tag methods that prevent radio frequency identification (RFID) of a user from being read. The kill tag methods inactivate an RFID tag including a password when the same password as the password of the RFID tag and a kill command are received from a reader. The RFID tag including a circuit that could be shorted is dead when the circuit is short. There is no method to restore the dead RFID tag. The blocker tag methods have a different operating principle according to collision avoidance systems. In a binary tree-walking system, the user owns a separate blocker tag that consistently responds yes or no to all inquiry messages of the reader so that the reader is confused due to actual information of the user. In a slot aloha system, the reader is confused due to a separate blocker tag that responds to all slots and causes collision. Also, unlike the blocker tag methods, a method of encrypting RFID prevents an eavesdropper from exactly understanding information.

However, when an authentic reader attempts to read belongings of the user, for example, an authorized legal institution having a search right such as the Exit and Entry Control Bureau searches for belongings of a passenger, the authentic reader cannot find RFIDs of the belongings of the passenger using the kill and blocker tag methods. Also, although the eavesdropper reads an encrypted RFID and cannot exactly understand content included therein, the eavesdropper can acquire the number of RFID tags owned by the user, and use the encrypted value of RFID to track a movement route of the user. If valuables, money, securities, etc. use the RFID encrypting method, the number of RFID tags of the valuables, money, securities, etc. is exposed and the RFID tags are illegally tracked, which may infringe user's privacy.

SUMMARY OF THE INVENTION

The present invention provides an apparatus of unifying multiple radio frequency identifications (RFID) for protecting user's privacy by preventing an eavesdropper from acquiring information of RFID tags that belong to a user, a reader linked with the apparatus, and a user's privacy protection method using the apparatuses.

According to an aspect of the present invention, there is provided an apparatus for unifying multiple radio frequency identifications (RFIDs), the apparatus comprising: a data arithmetic operator collecting RFIDs, storing the collected RFIDs, and repeatedly performing the collection and storage when a time out event occurs; a hash arithmetic operator concatenating the RFIDs, hashing the concatenated RFIDs, and outputting a hashed single value; a random number generator generating a random number used as an encryption factor to public-key-encrypt the single value; an RFID tag processor controlling locking/unlocking of the RFID tags; a public key arithmetic operator public-key-encrypting the single value using a predetermined public key and the random number as encryption factors and outputting a cipher text; and a radio frequency communicator converting the cipher text into a radio signal and sending the radio signal to a radio section.

According to another aspect of the present invention, there is provided a single value reader comprising: a radio communicator receiving a cipher text obtained by concatenating RFIDs, hashing the concatenated RFIDs, outputting a hashed single value, and public-key-encrypting the single value; a private key decryption operator decrypting the cipher text using its own private key and restoring the single value; and an arithmetic operator symmetry-key-encrypting an RFID request message of a user using the single value as an encryption key, decrypting the symmetry-key-encrypted RFIDs in response to the RFID request message, if the RFIDs are successfully obtained, and symmetry-key-encrypting the success message using the single value as the encryption key.

According to another aspect of the present invention, there is provided a method of unifying multiple RFIDs, the method comprising: (a) collecting RFIDs, concatenating the RFIDs, hashing the concatenated RFIDs, and outputting a hashed single value; (b) generating a random number, public-key-encrypting the single value using a predetermined public key and the random number as encryption factors, and transmitting a cipher text to a radio section; and (c) receiving an RFID request message from a single value reader that receives the cipher text, if the RFID request message is authentic, symmetry-key-encrypting the RFIDs, and transmitting the symmetry-key-encrypted RFIDs to the single value reader.

According to another aspect of the present invention, there is provided a user privacy protection method by unifying multiple RFIDs using a single value reader and an apparatus for unifying the multiple RFIDs as a single value, the method comprising: (a) the apparatus for unifying the multiple RFIDs collecting the RFIDs, concatenating the RFIDs, hashing the concatenated RFIDs, outputting a hashed single value, generating a random number, public-key-encrypting the single value using a predetermined public key and the random number as encryption factors, and transmitting a cipher text to a radio section; (b) the single value reader receiving the cipher text, obtaining the single value and requesting RFIDs using the single value as an encryption key; (c) the apparatus for unifying the multiple RFIDs determining whether the RFID request message is authentic, if the RFID request message is authentic, symmetry-key-encrypting the RFIDs, and transmitting the symmetry-key-encrypted RFIDs to the single value reader; and (d) if the single value reader receives the symmetry-key-encrypted RFIDs, transmitting a success message to the apparatus for unifying the multiple RFIDs.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

The present invention will now be described more fully with reference to the accompanying drawings, in which exemplary embodiments of the invention are shown.

Figure 1:
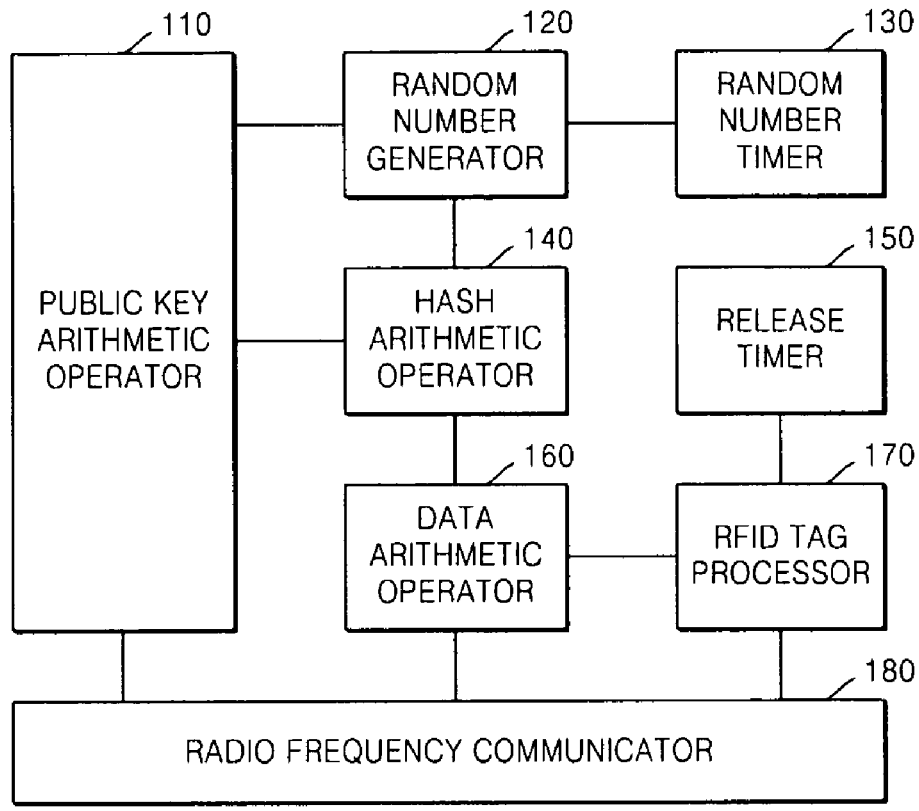
FIG. 1 is a block diagram of an apparatus for unifying multiple radio frequency identifications (RFID) according to an embodiment of the present invention.

FIG. 1 is a block diagram of an apparatus for unifying multiple radio frequency identifications (RFID) according to an embodiment of the present invention. The apparatus is referred to as a "single value tag" or a "blackout tag". Referring to FIG. 1, the apparatus comprises a data arithmetic operator 160, a hash arithmetic operator 140, a random number generator 120, a random number timer 130, a public key arithmetic operator 110, an RFID tag processor 170, a release timer 150, and a radio frequency communicator 180.

The operation of the constituents will now be in detail described. The data arithmetic operator 160 collects RFIDs of RFID tags belonging to a user and stores the collected RFIDs. Since all the RFID tags of the user excluding the apparatus are made in a lock mode, when the data arithmetic operator 160 receives an RFID request command from a single value reader illustrated in FIG. 2, it transmits the RFIDs stored in the apparatus to the single value reader. The data arithmetic operator 160 must encrypt response data using a symmetry key to protect the RFIDs to be transmitted to the single value reader, and can use a single value created by the hash arithmetic operator 140 as an encryption key.

The hash arithmetic operator 140 creates the single value by concatenating the RFIDs collected by the data arithmetic operator 160 and hashing the combination value. The concatenating means a sequential enumeration of the RFIDs.

The random number generator 120 generates a random number used as an encryption factor to encrypt the single value using a public key. If the RFID tags belonging to the user are not added or removed for a long time, it means that the single value remains for that time. Therefore, when a public key value and encrypted data are identical to each other, the RFIDs can be tracked by an eavesdropper because of the same cipher text. To prevent the RFIDs from being tracked, a public key algorithm that uses the public key value and the random number as encryption factors is used in the present invention. The random number generator 120 generates the random number to be used as the encryption factor. An example of the public key algorithm that uses the random number as the encryption factor is an El Gamal algorithm.

The random number timer 130 notifies an effective period of the random number. Although the public key value and the encrypted data are identical to each other for a long time, since the random number is periodically changed and a new cipher text is generated, the random number timer 130 is a time when to change the random number.

The public key arithmetic operator 110 public-key-encrypts the single value created by the hash arithmetic operator 140 using a public key of an authorized institute that owns the single value reader and the random number generated by the random number generator 120 as encryption factors. A cipher text obtained by public-key-encrypting the single value is an RF signal that is transmitted to a radio section. Therefore, the single value reader of the authorized institute having a private key corresponding to the public key can decrypt the cipher text and restore the single value.

The RFID tag processor 170 locks the RFID tags belonging to the user and releases the locked RFID tags. The RFID tags are locked after the data arithmetic operator 160 collects the RFIDs of the user. The RFID tags belonging to the user are locked after the RFIDs are notified of the apparatus so that the RFIDs themselves cannot be externally notified. The RFIDs belonging to the user can be notified when the user personally releases the locked RFID tags, or the authorized institute having a private key corresponding to the public key requests the RFIDs collected by the apparatus.

The release timer 150 notifies a timeout event to release the locked RFID tags after a predetermined time passes. If an RFID tag belonging to a user is permanently locked, and is assigned to another user, another user cannot read the permanently locked RFID tag. To read the permanently locked RFID tag, the permanently locked RFID tag is released after the predetermined time passes. The RFID tag can be locked and released without an intervention of the user.

The apparatus for unifying multiple RFIDs of the current embodiment of the present invention manages a locking continued time of the RFIDs of the user using the release timer 150. For example, if the release timer 150 is set to repeatedly lock the RFID tags and release the locked RFID tags every sixty seconds, and an effective time of sixty seconds is notified of the RFID tags, when the user's RFID tags remain unchanged, the RFID tag processor 170 repeatedly releases and locks the RFID tags every sixty seconds. If the whole or some of the RFID tags are assigned to another user, since the assigned RFID tags are released after sixty seconds pass, a right to manage the RFID tags can be automatically assigned without an intervention of the previous or new user.

The radio frequency communicator 180 is responsible for the communication in a radio section. The radio frequency communicator 180 transmits/receives data and control signals to/from outside, thereby collecting the RFID tags, transmitting lock and release signals of the RFID tags and the cipher text of the single value, requesting the RFIDs of the single value reader, and transmitting response data to the request.

Figure 2:
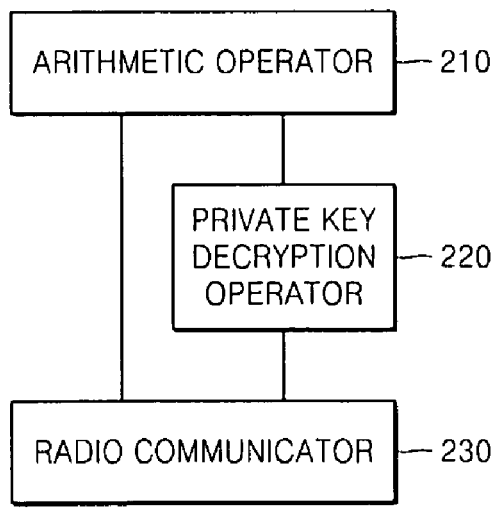
FIG. 2 is a block diagram of a single value reader according to an embodiment of the present invention.

FIG. 2 is a block diagram of the single value reader 200 according to an embodiment of the present invention. Referring to FIG. 2, the single value reader 200 comprises an arithmetic operator 210, a private key decryption operator 220, and a radio communicator 230.

The private key decryption operator 220 decrypts a public key cipher text transmitted from the apparatus for unifying multiple RFIDs using its own private key and restores a single value.

The arithmetic operator 210 obtains RFIDs belonging to a user. That is, the arithmetic operator 210 requests RFIDs stored in the apparatus and receives the RFIDs. To verify the single value reader 200 to be authentic, the arithmetic operator 210 does not transmit request data as a plain text but a symmetry key cipher text that can be understood by the apparatus. The encryption key is the single value restored by the private key decryption operator 220. Because the apparatus does not respond to a non-encrypted request such that the single value reader 200 can be authenticated. Also, the apparatus encrypts the RFIDs in response to the request, thereby protecting the RFIDs from being eavesdropped.

The radio communicator 230 is a path of the data and control signals communicated between the apparatus and the single value reader 200. The radio communicator 230 receives the cipher text obtained by public-key-encrypting the single value, sends the received cipher text to the private key decryption operator 220, sends an RFID request command, and transfers response data to the request.

Figure 3:
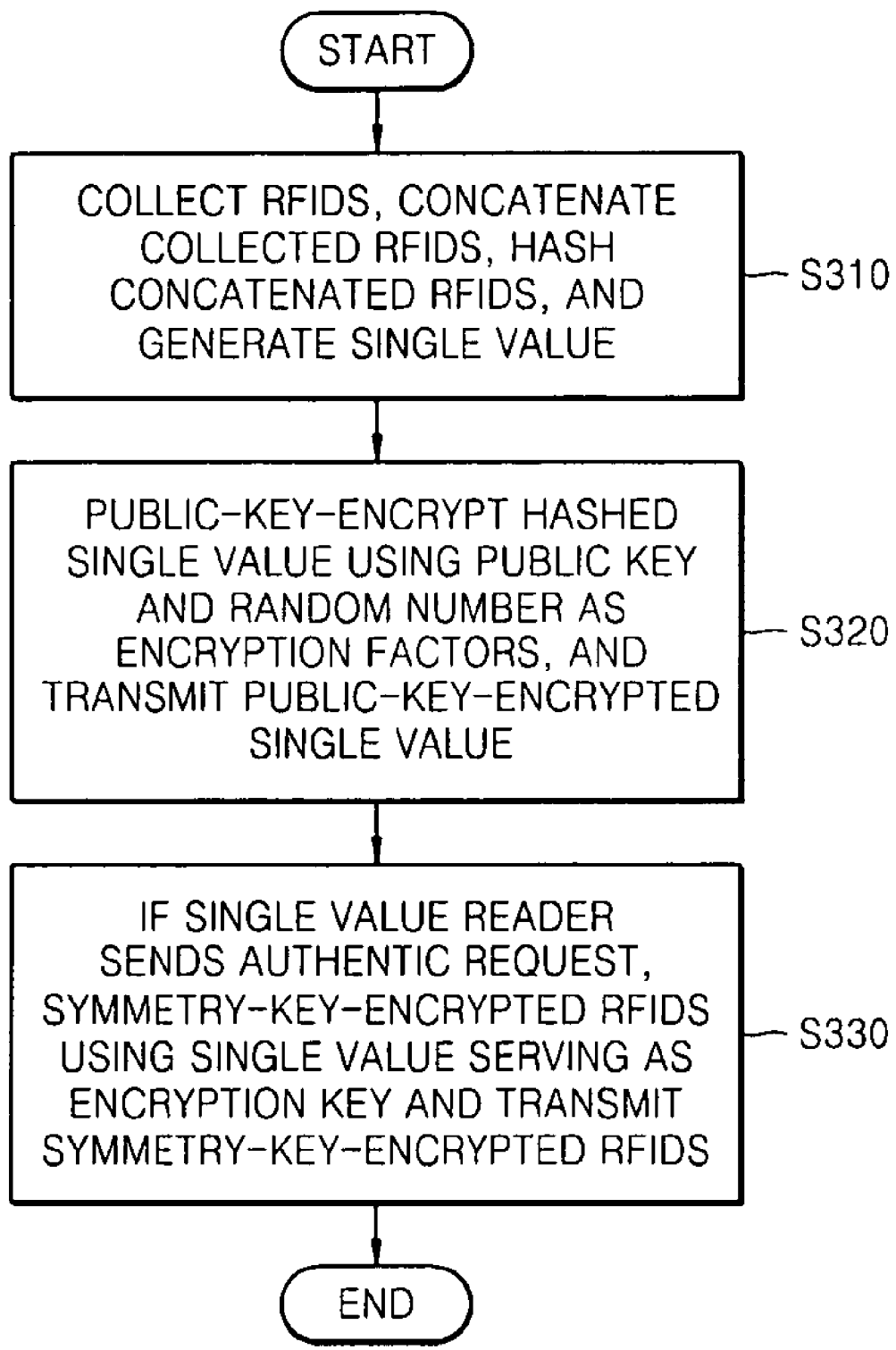
FIG. 3 is a flowchart illustrating a method of unifying multiple RFIDs according to an embodiment of the present invention.
Figure 4A:
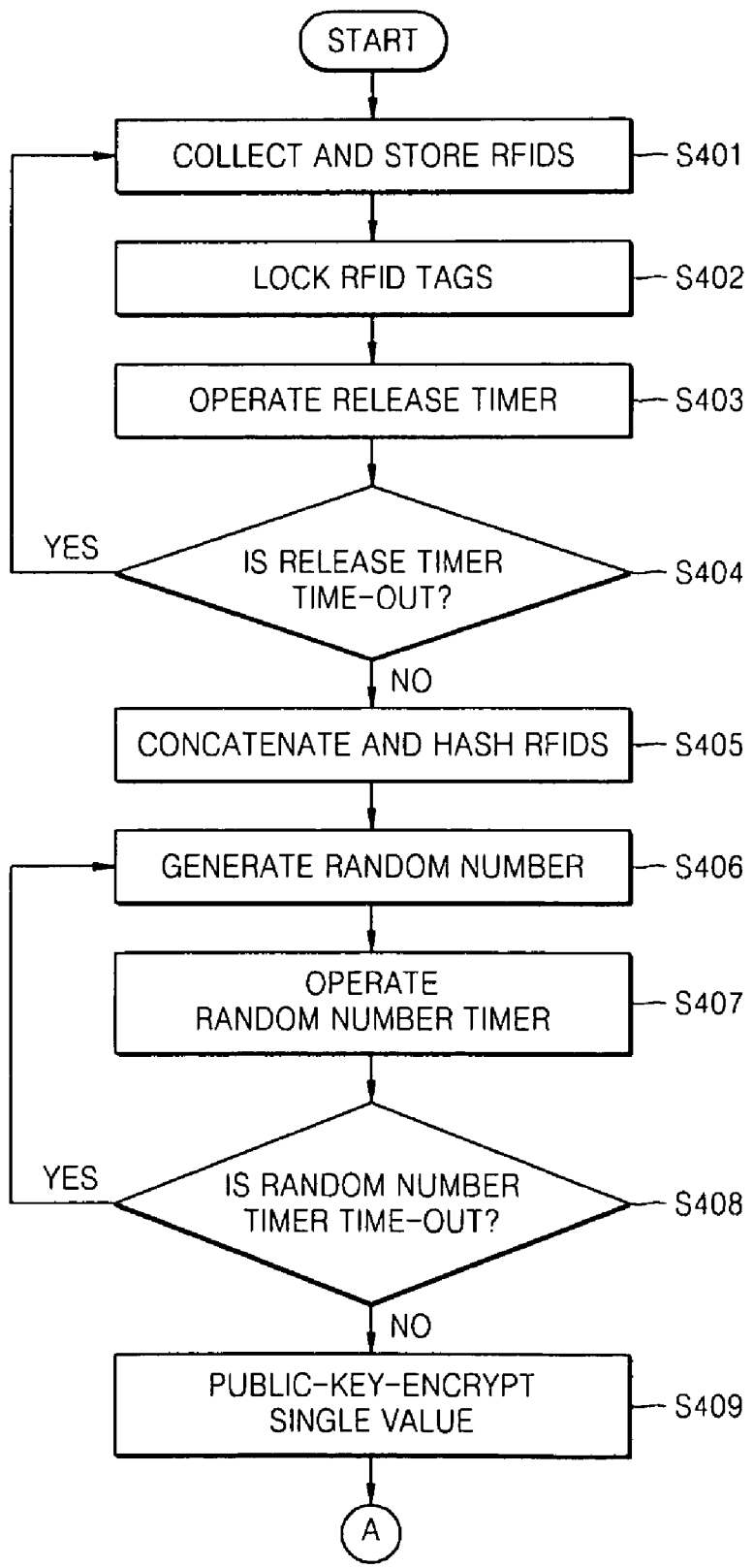
FIGS. 4A and 4B are flowcharts illustrating a user privacy protection method using an apparatus for unifying multiple RFIDs and a single value reader according to an embodiment of the present invention.
Figure 4B:
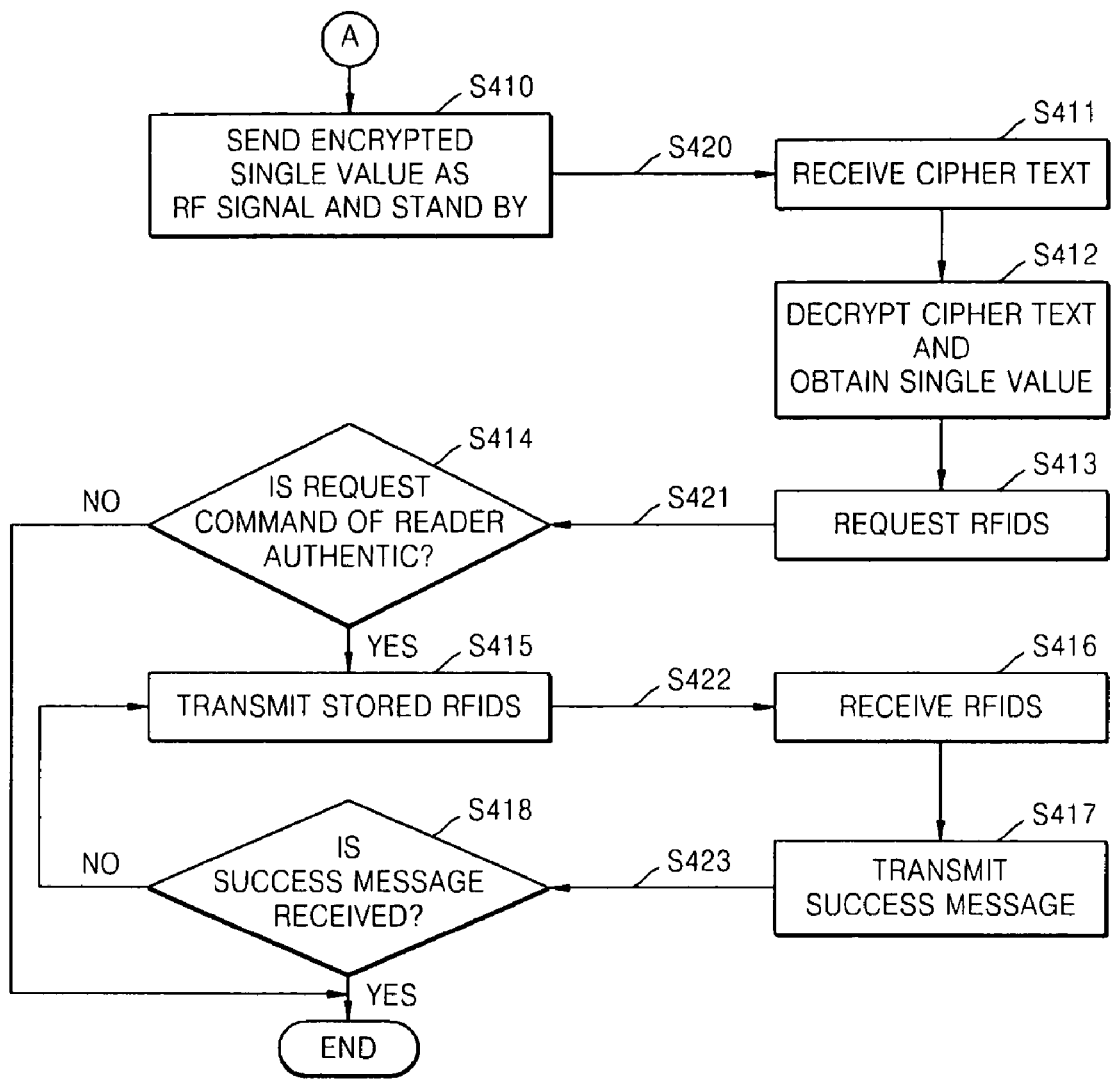
Figure 5:
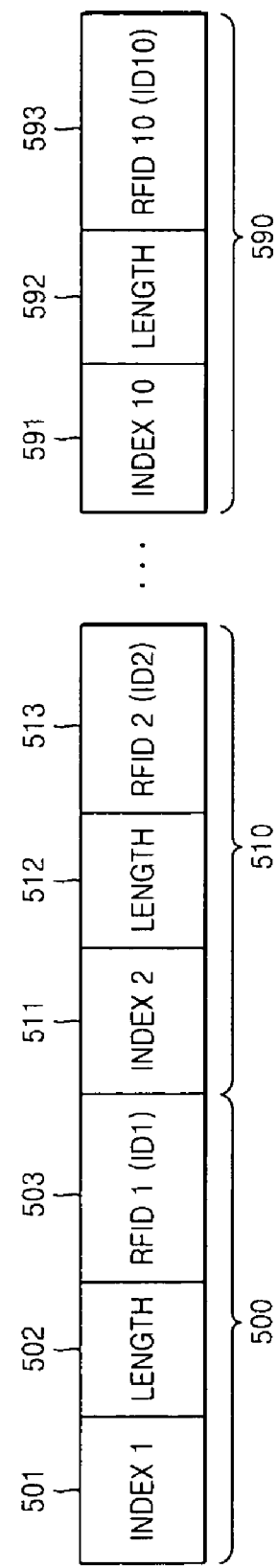
FIG. 5 is a block diagram of a frame used to transmit RFIDs according to an embodiment of the present invention.

FIG. 3 is a flowchart illustrating a method of unifying multiple RFIDs according to an embodiment of the present invention. FIGS. 4A and 4B are flowcharts illustrating a user privacy protection method using an apparatus for unifying multiple RFIDs and a single value reader according to an embodiment of the present invention. FIG. 5 is a block diagram of a frame used to transmit RFIDs according to an embodiment of the present invention.

Referring to FIG. 3, an apparatus for unifying multiple RFIDs collects RFIDs of multiple RFID tags, concatenates the collected RFIDs, hashes the concatenated RFIDs, and generates a single value in Operation S310. The apparatus for unifying multiple RFIDs generates a random number, public-key-encrypts the hashed single value using a public key and the random number as encryption factors, and transmits a cipher text obtained by public-key-encrypting the single value to a radio section in Operation S320. The apparatus for unifying multiple RFIDs receives an RFID transmission request message from a single value reader that received the cipher text and determines whether the RFID transmission request message is authentic. If the RFID transmission request message is determined to be authentic, the apparatus for unifying multiple RFIDs symmetry-key-encrypts the RFIDs using the single value as an encryption key, and transmits the symmetry-key-encrypted RFIDs to the single value reader in Operation S330. After standing by for a while, the apparatus for unifying multiple RFIDs resumes its operation when receiving an RFID transmission request from the single value reader. The operation will now be described with reference to FIGS. 4A and 4B.

Referring to FIGS. 4A and 4B, the apparatus for unifying multiple RFIDs collects RFIDs belonging to a user and stores the collected RFIDs in Operation S401. For example, If RFIDs of ten RFID tags are ID1, ID2, ID3, ID4, ID5, ID6, ID7, ID8, ID9, and ID10, the data arithmetic operator 160 of the apparatus for unifying multiple RFIDs collects the ten RFIDs and stores the collected RFIDs.

The apparatus for unifying multiple RFIDs locks the RFID tags belonging to the user in Operation S402.

The apparatus for unifying multiple RFIDs operates a release timer to release the locked RFID tags after a predetermined time passes in Operation S403. This will be in detail described later.

The apparatus for unifying multiple RFIDs concatenates the collected RFIDs, hashes the collected RFIDs, and generates a single value in Operation S405 if the release timer is not timeout in Operation S404. The hashed single value can be expressed as below.

H_ID=Hash(ID1 || ID2 || ID3 || ID4 || ID5 || ID6 || ID7 || ID8 || ID9 || ID10).

H_ID denotes the single value and is used as an encryption key for symmetry-ley-encrypting/decrypting an RFID request and response data. The apparatus for unifying multiple RFIDs generates a random number used as an encryption factor to public-key-encrypt the single key in Operation S406. The random number is expressed as R.

The apparatus for unifying multiple RFIDs operates a random number timer to reproduce the random number after a predetermined time passes in Operation S407. The operation relating to a timeout of the random number timer will be described later.

The apparatus for unifying multiple RFIDs public-key-encrypts the single value in Operation S409 if the random number timer is not timeout in Operation S408. A public key encryption algorithm used by the apparatus for unifying multiple RFIDs is an El Gamal algorithm. The El Gamal algorithm uses the public key and a separate encryption factor to generate cipher text. The El Gamal algorithm uses seven parameters, i.e., a generator g, a public key y, a cipher text 1 a, a cipher text 2 b, a private key x, a plain text message m, and an encryption factor r.

[Encryption Operation of the El Gamal Algorithm]

x: the private key generated where the encryption operation is performed r: the encryption factor generated where the encryption operation is performed $y=g^x$: the public key obtained by exponent-multiplying the generator by the private key $a=g^r$: the cipher text 1 obtained by exponent-multiplying the generator by the encryption factor $b=m\cdot y^r$: the cipher text 2 obtained by multiplying the plain text message by the value obtained by exponent-multiplying the public key by the encryption factor In detail, although the private key, the public key, and the plain text message remain unchanged for a long time, the externally published cipher texts 1 and 2 have a different value due to a different encryption factor.

[Decryption Operation of the El Gamal Algorithm]

$$b=m\cdot y^r$$

$$m=b/y^r=b/(g^x)^r=b/(g^r)^x=b/a^x$$

a and b are public and $a^x$ can be obtained when the private key x is known, and thus m can be restored.

The encryption operation and Operation S405 can be expressed as below.

Cipher text 1: $a=g^r$

Cipher text 2: $b=H\_ID\cdot y^r$

The apparatus for unifying multiple RFIDs sends the public-key-encrypted cipher text to the radio section and stands by in Operation S410. Operations S401, S402, S403, S405, S406, S407, S409, and S410 are performed using the apparatus for unifying multiple RFIDs.

The reception operation of the single value reader will now be described. The single value reader receives the cipher text sent to the radio section in Operation S411.

The single value reader decrypts the received cipher text using the private key and obtains the single value in Operation S412. The decryption operation is expressed as below.

Cipher text 1: $a=g^r$

Cipher text 2: $b=H\_ID\cdot y^r$

Restored single value: $H\_ID=b/y^r=b/(g^x)^r=b/(g^r)^x=b/a^x$

The single value reader requests the apparatus for unifying multiple RFIDs to send RFIDs belonging to the user in Operation S413. The single value reader transmits a cipher text obtained by symmetry-key-encrypting response data using the restored single value H_ID as the encryption key to the apparatus for unifying multiple RFIDs. The present invention recommends the advanced encryption standard (AES) as a symmetry key algorithm. If the length of the single value is not the same as that of an encryption key of the AES, it is provided that both lengths are modified to be identical to each other under the agreement of the single value reader and the apparatus for unifying multiple RFIDs.

The apparatus for unifying multiple RFIDs receives the cipher text transmitted by the single value reader in Operation S421, decrypts the cipher text using its own single value as the encryption key, and authenticates that the cipher text is an RFID request command. If the cipher text is not the RFID request command, the apparatus for unifying multiple RFIDs disregards the RFID request command in Operation S414.

The apparatus for unifying multiple RFIDs transmits the RFIDs stored in the data arithmetic operator 160 to the single value reader according to the RFID request command in Operation S415. Since the RFIDs have a different length based on the standard, each of the RFIDs includes indexes 501, 511, and 591, lengths 502, 512, and 592, and RFIDs 503, 513, and 593, respectively, as illustrated in FIG. 5. Also, the apparatus for unifying multiple RFIDs transmits a cipher text obtained by symmetry-key-encrypting the RFIDs using its own single value H_ID as the encryption key to the single value reader in Operation S422.

The single value reader receiving the cipher text transmitted from the apparatus for unifying multiple RFIDs decrypts the cipher text using the single value H_ID as the encryption key, and authenticates the RFIDs belonging to the user in Operation S416. Since the decrypted data is a message illustrated in FIG. 5, the single value reader can identify the total number of the RFIDs and individual RFIDs even if the RFIDs have a different length.

The single value reader recognizes the RFIDs and transmits a success message in Operation S423 indicating that the RFIDs are completely received in Operation S417 to the apparatus for unifying multiple RFIDs.

If the apparatus for unifying multiple RFIDs receives the success message in Operation S418, it completes a user privacy protection process. If the apparatus for unifying multiple RFIDs fails receiving the success message in Operation S418, it performs Operation S415 again.

The operation of the release timer 150 will now be described. After Operation S403 is performed, if a time out event occurs in the release timer 150 in Operation S404, the apparatus for unifying multiple RFIDs performs Operation S401 again in order to detect a change in ownership of the RFID tags belonging to the user. If the RFID tags are assigned to another user, a cipher text of single value to be transmitted to the radio section is accordingly changed. The apparatus for unifying multiple RFIDs periodically collects RFIDs and generates a single value to respond to the change in ownership of the RFID tags based on the operation of the release timer 150.

The operation of the random number timer 130 will now be described. After Operation S407 is performed, if the time out event occurs in the random number timer 130 in Operation S408, the apparatus for unifying multiple RFIDs performs the generation of the random number in Operation S406 again. A random number is used as an encryption factor in Operation S409, thereby modifying the cipher text sent to the radio section in Operation S420. The cipher texts 1 and 2 can be expressed using equations in Operation S409 below.

Cipher text 1: $a'=g^{r'}$

Cipher text 2: $b'=H\_ID \cdot y^{r'}$

The ownership of the RFID tags belonging to the user remains unchanged for a long time, resulting in no change in the single value. Although a key value is not changed, the encryption factor is periodically changed, thereby generating a new cipher text and transmitting the cipher text to the radio section. The time out events of the release timer 150 and the random number timer 130 result in a change in the cipher text of the single value transmitted to the radio section, it is difficult to determine whether the ownership of the RFID tags belonging to the user is changed even though the cipher text is eavesdropped. Also, the user does not transmit the same cipher text every time, thereby preventing the user from being illegally tracked.

The present invention can also be embodied as computer readable code on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves. The computer readable recording medium can also be distributed over network coupled computer systems so that the computer readable code is stored and executed in a distributed fashion.

The present invention unifies RFIDs of multiple RFID tags as a single encrypted value. The effect of the present invention is addressed as follows:

First, the apparatus for unifying the RFIDs transmits information to a radio section. The information is a cipher text obtained by public-key-encrypting the single value. Therefore, the number of the RFID tags belonging to a user is not exposed to an eavesdropper, thereby protecting user's privacy.

Second, the information is a value that is changed always or periodically according to changes in the RFID tags belonging to the user. Therefore, the eavesdropper cannot track the RFID tags, thereby protecting user's privacy.

Third, the cipher text is encrypted using a public key of an authorized institute having a single value reader so that it can be decrypted by the single value reader having a private key corresponding to the public key, thereby preventing the eavesdropper from obtaining information from the cipher text and protecting the user's privacy, and acquiring information on the RFIDs belonging to the user by the authorized institute when public profit and security are required.

Fourth, the apparatus and method for unifying the multiple RFIDs are not limited to a specific collision avoidance system so that they can be applied to conventional slotted aloha and binary tree-walking systems, and various collision avoidance systems.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An apparatus for unifying multiple radio frequency identifications (RFIDs), the apparatus comprising:
    a data arithmetic operator collecting RFIDs of at least one RFID tags, storing the collected RFIDs, and repeatedly performing the collection and storage when a time out event occurs;
    a hash arithmetic operator concatenating the RFIDs, hashing the concatenated RFIDs, and outputting a hashed single value;
    a random number generator generating a random number used as an encryption factor to public-key-encrypt the single value;
    an RFID tag processor controlling locking/unlocking of the RFID tags;
    a public key arithmetic operator public-key-encrypting the single value using a predetermined public key and the random number as encryption factors and outputting a cipher text; and
    a radio frequency communicator converting the cipher text into a radio signal and sending the radio signal to a radio section.

2. The apparatus of claim 1, wherein the data arithmetic operator further comprises: an encoder symmetry-key-encrypting the RFIDs stored in the data arithmetic operator using the single value as an encryption key according to an authentic request of a single value reader and outputting the symmetry-key-encrypted RFIDs to the radio frequency communicator.

3. The apparatus of claim 1, wherein the random number generator comprises: a random number timer inducing a change in the random number according to a change period of the random number.

4. The apparatus of claim 1, wherein the RFID tag processor comprises: a release timer producing the time out event that locks the RFIDs collected by the data arithmetic operator and releases the locked RFIDs after a predetermined time passes.

5. The apparatus of claim 1, wherein the public key is owned by an institute authorized to recover the single value.

6. A single value reader comprising:
 a radio communicator receiving a cipher text obtained by concatenating RFIDs, hashing the concatenated RFIDs, outputting a hashed single value, and public-key-encrypting the single value;
 a private key decryption operator decrypting the cipher text using the single value reader's own private key and restoring the single value; and
 an arithmetic operator symmetry-key-encrypting an RFID request message of a user using the single value as an encryption key, decrypting the symmetry-key-encrypted RFIDs in response to the RFID request message, if the RFIDs are successfully obtained, and symmetry-key-encrypting the obtained success message using the single value as the encryption key.

7. The single value reader of claim 6, wherein the arithmetic operator symmetry-key-encrypts the RFID request message and the success message, if the length of the single value is not the same as that of an encryption key of an advanced encryption standard (AES), and modifies the length to be identical to each other.

8. A method of unifying multiple RFIDs, the method comprising:
 (a) collecting RFIDs, concatenating the RFIDs, hashing the concatenated RFIDs, and outputting a hashed single value;
 (b) generating a random number, public-key-encrypting the single value using a predetermined public key and the random number as encryption factors, and transmitting a cipher text to a radio section; and
 (c) receiving an RFID request message from a single value reader that receives the cipher text, if the RFID request message is authentic, symmetry-key-encrypting the RFIDs, and transmitting the symmetry-key-encrypted RFIDs to the single value reader.

9. The method of claim 8, wherein operation (a) comprises:
 (a1) locking RFID tags of the collected RFIDs;
 (a2) operating a release timer having a predetermined sustain time from when the RFID tags are locked;
 (a3) concatenating the RFIDs, hashing the concatenated RFIDs, and outputting the hashed single value; and
 (a4) determining whether the release timer terminates, and if the release timer terminates, releasing the locked RFIDs, performing operation (a3) after collecting the RFIDs, and returning to operation (a1).

10. The method of claim 8, wherein operation (b) comprises:
 (b1) generating the random number and operating a random number timer having a predetermined sustain time; and
 (b2) if the sustain time passes, discarding the random number and generating a new random number.

11. The method of claim 8, wherein operation (c) comprises:
 (c1) decrypting the RFID request message using the single value as an encryption key; and
 (c2) if the RFID request message is authentic, symmetry-key-encrypting the RFIDs using the single value as the encryption key and transmitting the symmetry-key-encrypted RFIDs, if a success message corresponding to the RFID request message is not received, and re-transmitting the symmetry-key-encrypted RFIDs.

12. The method of claim 11, wherein operation (c2) comprises:
 (c21) forming each of the RFIDs in a frame consisting of index, length of the RFID, and the RFID; and
 (c22) symmetry-key-encrypting the frame using the single value as the encryption key and transmitting the symmetry-key-encrypted frame.

13. A user privacy protection method using a single value reader and an apparatus for unifying the multiple RFIDs as a single value, the method comprising:
 (a) the apparatus for unifying the multiple RFIDs collecting the RFIDs, concatenating the RFIDs, hashing the concatenated RFIDs, outputting a hashed single value, generating a random number, public-key-encrypting the single value using a predetermined public key and the random number as encryption factors, and transmitting a cipher text to a radio section;
 (b) the single value reader receiving the cipher text, obtaining the single value and requesting RFIDs using the single value as an encryption key;
 (c) the apparatus for unifying the multiple RFIDs determining whether the RFID request message is authentic, if the RFID request message is authentic, symmetry-key-encrypting the RFIDs, and transmitting the symmetry-key-encrypted RFIDs to the single value reader; and
 (d) if the single value reader receives the symmetry-key-encrypted RFIDs, transmitting a success message to the apparatus for unifying the multiple RFIDs.

14. The method of claim 13, wherein operation (a) comprises:
 (a1) locking RFID tags of the collected RFIDs, and operating a release timer having a predetermined sustain time from when the RFID tags are locked;
 (a2) concatenating the RFIDs, hashing the concatenated RFIDs, and outputting the hashed single value;
 (a3) determining whether the release timer terminates, and if the release timer terminates, releasing the locked RFIDs, performing operation (a2) after collecting RFIDs, and returning to operation (a1);
 (a4) generating the random number and operating random number timer having a predetermined sustain time; and
 (a5) if the sustain time passes, discarding the random number and generating a new random number.

15. The method of claim 13, wherein operation (b) comprises:
 (b1) receiving a cipher text including the single value; and
 (b2) decrypting the cipher text using its own private key and obtaining the single value.

16. The method of claim 13, wherein in operation (c), if an RFID request message is encrypted using the single value, the RFID request message is determined to be authentic.

* * * * *